United States Patent [19]

Saligny

[11] 4,057,843
[45] Nov. 8, 1977

[54] CABLE CONNECTION UNITS AND PROTECTION DEVICES

[75] Inventor: Yves Saligny, Cluses, France

[73] Assignee: Etablissements Carpano & Pons SA, Cluses, France

[21] Appl. No.: 675,484

[22] Filed: Apr. 9, 1976

[30] Foreign Application Priority Data

Apr. 25, 1975 France .............................. 75.13088

[51] Int. Cl.² ............................................. H02H 3/22
[52] U.S. Cl. .................................. 361/104; 174/72 B; 361/124; 339/18 C
[58] Field of Search .................... 317/9 R, 16, 31, 99, 317/116; 174/72 B; 339/18 R, 18 C; 361/1, 10, 331, 349, 117, 119, 124, 104

[56] References Cited

U.S. PATENT DOCUMENTS

| 1,303,383 | 5/1919 | Osborne | 317/9 R |
| 3,410,952 | 11/1968 | Knaub et al. | 174/72 B |
| 3,452,252 | 6/1969 | Mapham | 317/16 |
| 3,728,586 | 4/1973 | Inhelder et al. | 317/116 |
| 3,757,168 | 9/1973 | Kreuzer | 317/16 |
| 3,849,750 | 11/1974 | Baumbach et al. | 317/9 R |

OTHER PUBLICATIONS

IBM Tech. Disc. Bulletin "Laminated Bus System" by S. C. Rieley, vol. 12, No. 8, Jan. 1970 pp. 1268–1269.

Primary Examiner—Gerald Goldberg
Attorney, Agent, or Firm—Robert E. Burns; Emmanuel J. Lobato; Bruce L. Adams

[57] ABSTRACT

A cable connection unit comprises a pile of insulating plates carrying preformed conducting strips. A first end of each strip is connected to or forms a lead-in or lead-out terminal, and a second end is bent in an orifice traversing the pile. Plug modules plugged in one face of the pile have lead-in and lead-out pins contacting the bent second ends of the strips and a grounding pin contacting a grounding grid placed on the opposite face of the pile. The modules have fuses connecting their lead-in and lead-out pins and lightning protectors between these pins and the grounding pins. When a module is not plugged in, the bent second end of the corresponding lead-in terminal comes to contact the grounding grid.

17 Claims, 11 Drawing Figures

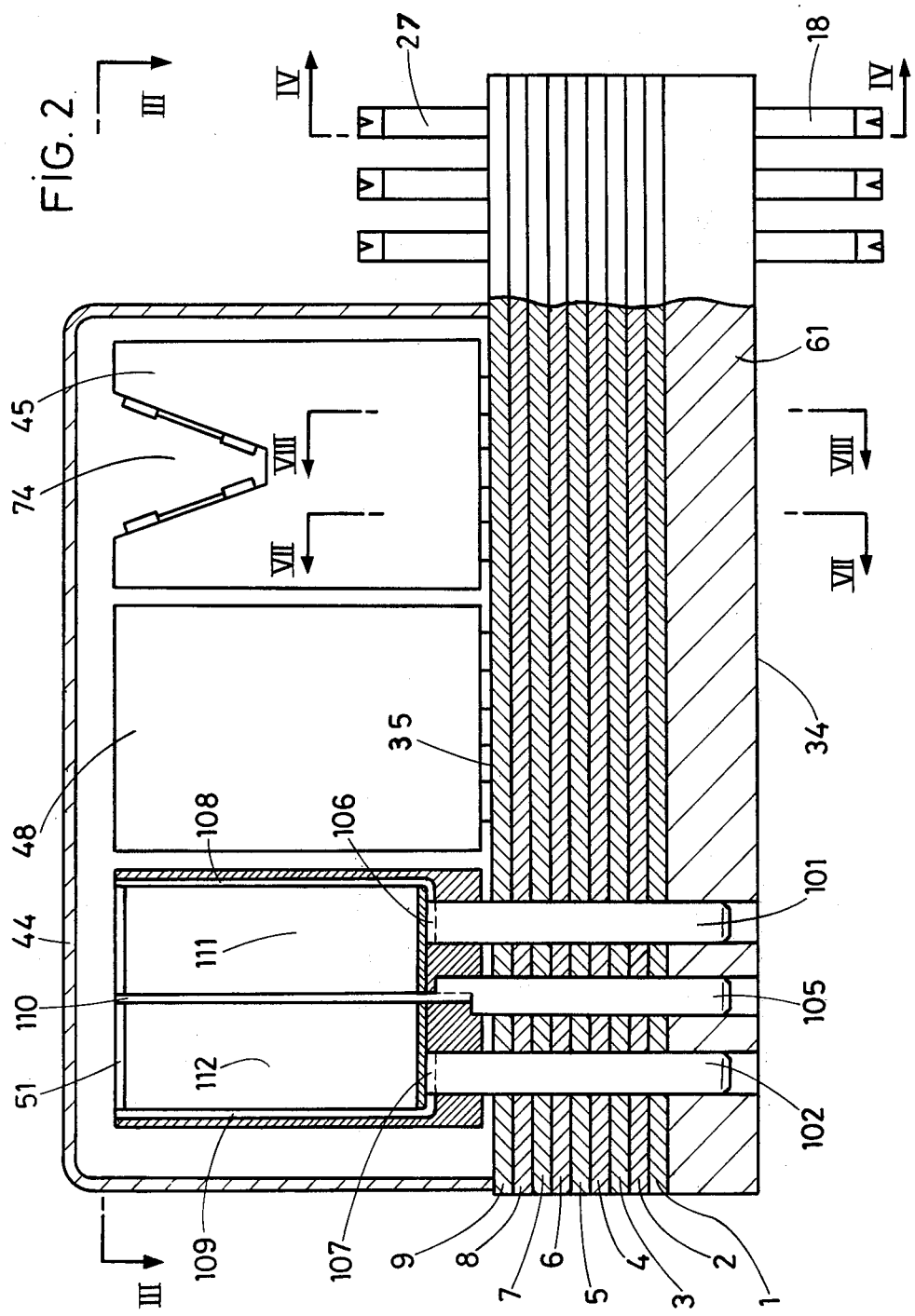

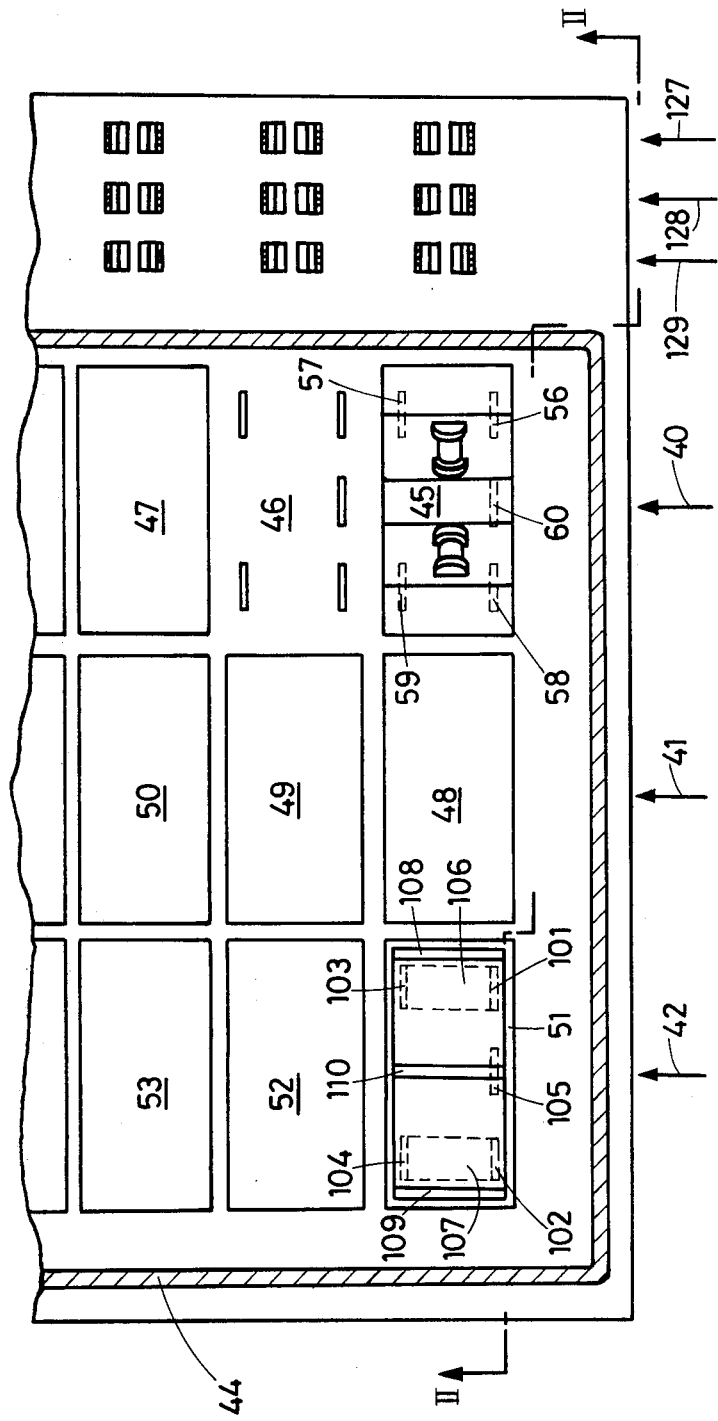

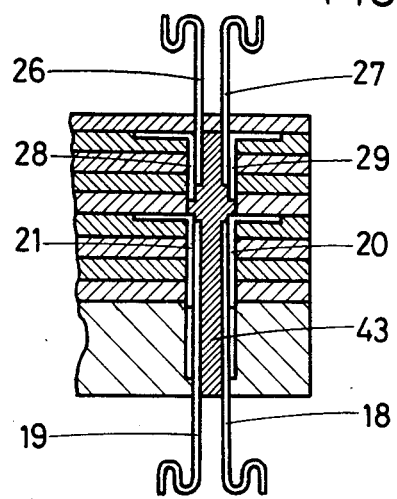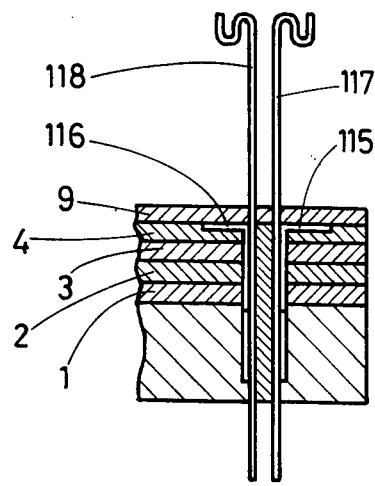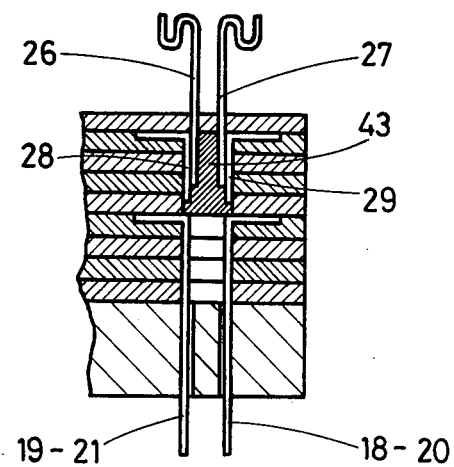

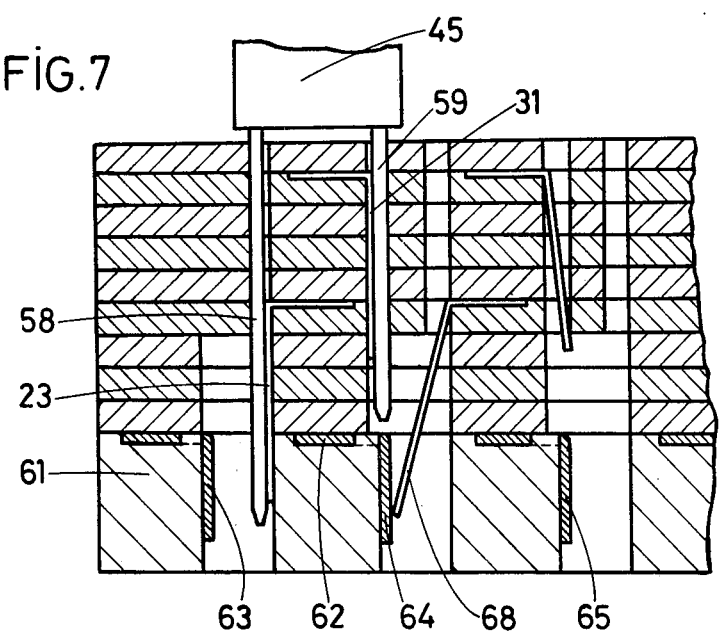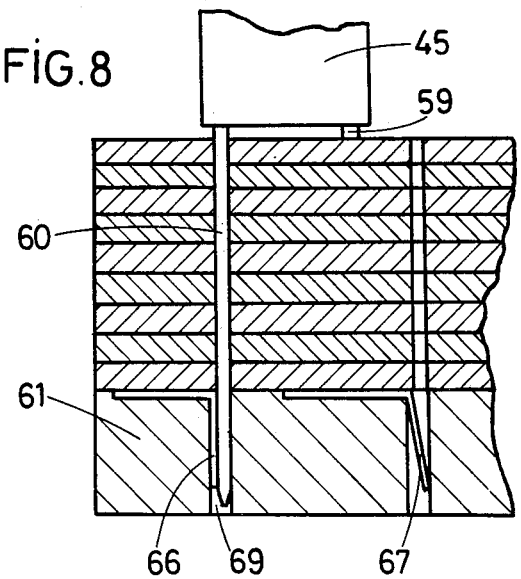

CABLE CONNECTION UNITS AND PROTECTION DEVICES

The invention concerns connection units or blocks for cable heads, in particular for telecommunications cables, comprising means for connecting a given number of line wires, which means are disposed between a lead-in terminal and a lead-out terminal provided for each wire. These means may possibly include protection means formed, for each line wire, on the one hand by a fuse connected between each lead-in terminal and corresponding lead-out terminal and/or, on the other hand, a lightning protector connected between each lead-in terminal and ground.

In known devices of this type, such as that described in French Pat. No. 2 185 878, the means for connecting each pair of line wires are formed by an insulating plate carrying the connection means, namely the lead-in and lead-out terminals as well as the means for protecting each line. These plates are piled to form a block of, for example, 28 plates. Such a block has the disadvantage of being relatively bulky and dismantling it is impractical. Moreover, the structure of each plate is complex; and it has many elements which are difficult to assemble and regulate.

An object of the invention is to provide a connection unit or block which avoids these advantages, and in which the means for protecting each line wire or line can be easily dismantled from the remainder of the unit. This is particularly interesting when the protection means includes fuses or lightning protectors which may have to be replaced.

According to the invention, a connection unit comprises a pile of insulating supports, generally flat plates, some of which have one or several preformed conducting elements fitted onto them. In general, two preformed conducting elements are used for each line wire. The first element has a first end connected to a lead-in terminal, or itself forming the lead-in terminal, and a bent second end disposed in a first orifice traversing the pile of insulating support plates. The second preformed conducting element has a first end connected to a lead-out terminal, or itself forming the lead-out terminal, and a bent second end disposed in a second orifice similar to the first. Each of the two terminals is disposed on a face of the pile, i.e., on opposite faces, or both on the same face. The bent second ends of the conducting elements are arranged to contact plug pins of at least one module which contains the means for protecting one or several line wires. Each module has parallel lead-in, lead-out and grounding plug pins. The grounding plug pin is able to cooperate with a part of complementary profile of a grounding circuit disposed in the proximity, preferably on the face of the pile opposite to the face in which the modules are plugged. The grounding circuit also has a part with which the prestressed bent second end of the first conducting element comes into contact when a module is not plugged into the pile.

In another arrangement, the lead-in and lead-out terminals of one and the same line wire are disposed on opposite faces of the pile, and are each formed in a single piece. A single preformed conducting element is provided for each line. This single conducting element is arranged as the preceding first or second element, with its first end connected to or integral with the single piece forming the lead-in and lead-out terminals. Its bent second end contacts the corresponding plug pin of a module. In this arrangement, the protection means consist of only a lightning protector connected between the connection plug pin of the module and a grounding plug pin.

It is previewed that in certain embodiments, the connection unit or block may be used without protection means, when these means are unnecessary, for example when the cables to be connected are underground. The connection unit according to the invention may be compact; for the same volume, it may enable the connection of twice as many lines as known blocks. Finally, the structure of the connection and protection means of the connection unit is very simple; the unit comprises a small number of elements which are easy to manufacture and assemble, and are of low cost.

The connection unit or block according to the invention may be used with their modules or, when a protection is not necessary, without them.

The accompanying drawings show, by way of example, an embodiment of the invention, and variations. In the drawings:

FIG. 2 is a cross-section along line II—II of FIG. 3 showing a complete embodiment of connection unit;

FIG. 3 is a plan view of the connection unit, in cross-section along line III—III of FIG. 2;

FIG. 4 is a cross-section along line IV—IV of FIG. 2, showing the lead-in and lead-out terminals of the unit;

FIGS. 5 and 6 are views similar to FIG. 4 of varied arrangements of lead-in and lead-out terminals;

FIG. 7 is a view partly in cross-section along line VII—VII of FIG. 2 showing the lead-in and lead-out plug pins of a module plugged in the pile;

FIG. 8 is a view partly in cross-section along line VIII—VIII of FIG. 2, showing the grounding plug pin of a module plugged on the pile;

Figure 1:
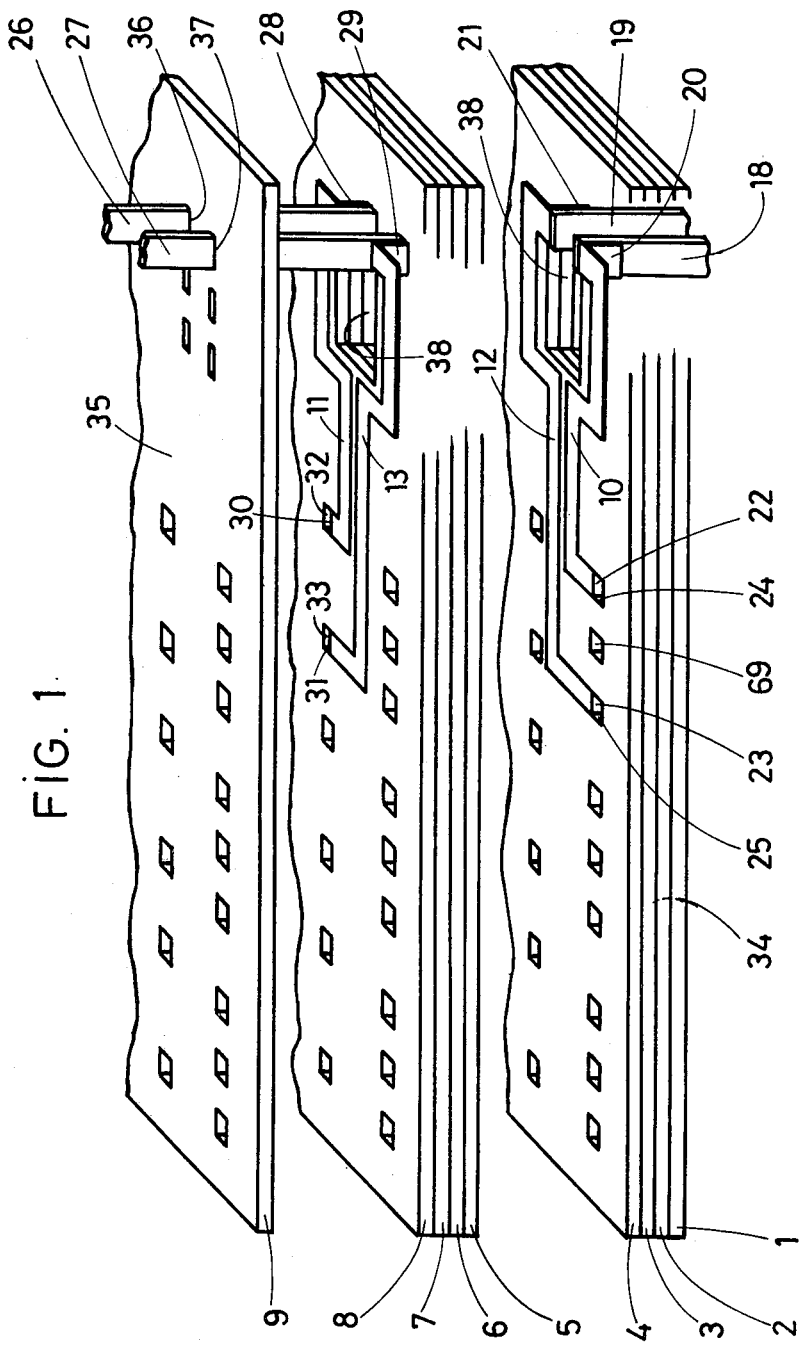
FIG. 1 is a partially-exploded perspective view of a pile of insulating supports carrying conductors and two lead-in and lead-out terminals.

As shown in FIG. 1, the connection unit comprises a pile of insulating support plates 1 to 9. The plates 1 to 8 each carry a given number of preformed conducting elements each formed by a cut-out and folded metal strip. These metallic conductors could be formed differently, for example by conducting wires. Each metal strip is advantageously inset in the insulating support plate carrying it, in a recess having the same dimensions as the strip.

In the example of FIG. 1, the conductors for connecting two wires of a line are shown. Each wire of the line uses two preformed conducting elements, 10 and 11 for the first wire, 12 and 13 for the second. The conducting elements 10 and 12, on plate 4, each have a first end with an integral bent-over end part 20,21 respectively connected to a respective lead-in terminal 18,19, and a bent over second end 22,23 engaging in an orifice 24,25 respectively. These orifices 24,25 extend transversaly right through the pile of insulating plates. Likewise, the conducting elements 11,13 on plate 8 each have an integral bent-over first end 28,29 connected to a respective lead-out terminal 26,27, and a second bent-over end 30,31 engaging in orifices 32,33 which also extend right through the pile of insulating plates. In our example, the lead-in terminals 18 and 19 are disposed on one face, 34, of the pile and the lead-out terminals 26,27 on the opposite face 35 of the pile. The insulating plate 9 holds the conducting elements 11 and 13 in place on the underlying insulating plate 8. The plate 9 has a series of discrete orifices 36,37 each for a respective lead-out terminal 26 and 27. The other plates 1 to 8 each have, as shown on FIG. 1, a single orifice 38 for receiving several lead-in and lead-out terminals side-by-side.

FIG. 4 shows in cross-section the connection of the lead-in terminals 18,19 and the lead-out terminals 26,27. These terminals are held in place by being jammed between the bent ends 20,21,28,29 and an insulating piece 43.

The insulating piece 43 could be eliminated, and the lead-in and lead-out terminals simply soldered onto the corresponding bent end parts. Likewise, as shown in FIG. 6, the terminals, for example the lead-ins 18 and 19 as shown, could be formed by integral extensions to the bent-over end parts 20,21.

The insulating plates, as shown, have a series of further transverse orifices similar to 24,25, 32 and 33 of FIG. 1, Each of these orifices may hence include other fitted conductors cooperating with other lead-in and lead-out terminals housed in orifices similar to 38. The other lead-in and lead-out terminals housed in orifice 38 can be connected to conductors carried by the other insulating plates 1,2,3,4,5,6 and 7.

The folded ends 22,23,30,31 (FIG. 1) are prestressed and formed to come into contact with terminals of appropriate profile provided on one or several plug modules containing means for protecting one or several line wires, two in our example.

FIGS. 2 and 3 show a connection unit including three rows 40,41,42 of modules. All of the modules are not visible on FIG. 3. This Figure shows only two modules 45 and 47 of the first row, the module corresponding to 46 being removed. The second and third rows comprise modules 48,49,50 and 51,52,53 respectively. A cover 44 is placed over all the modules.

Each module, for example 45, includes a lead-in plug pin 56 and a lead-out plug pin 57 for the first wire, a lead-in plug pin 58 and a lead-out plug pin 59 for the second wire, and a grounding plug pin 60. In the example, each module hence has five parallel pins 56 to 60. Pins 56,57,58,59 are plugged in the orifices 24,32,25,33 respectively (FIG. 1) against the bent-over ends 22,30,23,31. Pin 60 cooperates with a grounding circuit provided in an insulating block 61 below plate 1 (FIG. 2).

FIGS. 7 and 8 show this grounding circuit which is formed by a metal grid 62 inset in the upper face of the insulating block 61. The grid 62 has folded tabs 63 to 65 (FIG. 7) and 66 and 67 (FIG. 8).

FIG. 7 shows the lead-in plug pin 58 and lead-out plug pin 59 of module 45 plugged on the pile. When this module is not plugged in, the lead-in plug pin 58 does not hold the corresponding folded part 23, as shown, but this prestressed part 53 comes into contact with the folded tab 63. The same applies for folded end part 68 which contacts the folded tab 64 when module 46 is not plugged in. When, as shown in FIG. 7, the module 45 is plugged in, the corresponding prestressed folded part 23 is held spaced apart from tab 63 by the plug pin 58 with which it makes contact.

FIG. 8 shows the grounding plug pin 60 which passes through the entire pile into orifice 69 where it contacts tab 66 of the grounding grid.

Figure 9:
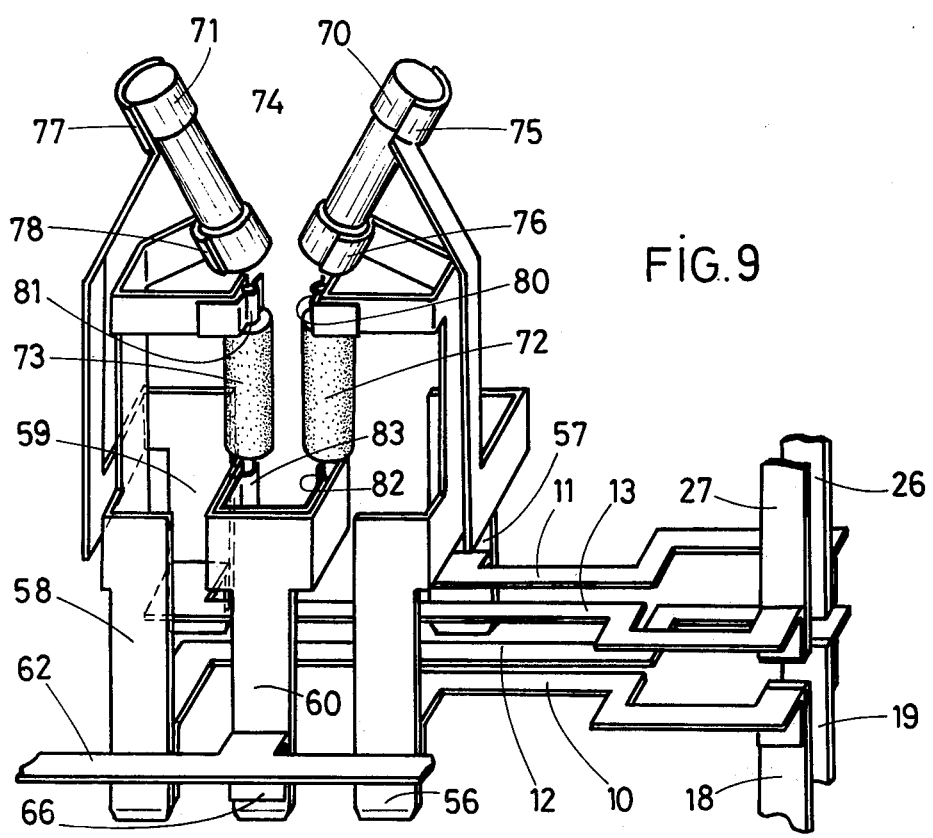
FIG. 9 is a perspective view of the conducting elements of a pile, and the conducting elements and protection means of a module for the connection and protection of two line wires.

FIG. 9 schematically shows the means for protecting two wires of a line as well as means for connecting the module 45 containing these lines, the latter means having already been described with reference to FIG. 1. For each line wire, the protection means of this module comprise a respective fuse 70,71 and a lightning protector 72,73 all housed in one or more recesses in the module. In the example, the fuse and lightning protector of a line wire are disposed substantially side-by-side with the fuse and lightning protector of the other wire of the same line. Moreover, the two fuses are disposed in V configuration with their facing parts leading into a recess 74 in the casing of the module. It is hence very easy to visually detect any breakdown of a fuse and to replace it via a lateral opening provided in the module for this purpose.

The ends of fuses 70 and 71 are held clipped between resilient blades 75,76 and 77,78 respectively and fixed parts, not shown. The blades 76 and 78 are in extension of the lead-in plug pins 56 and 58 of the module, and the blades 75,77 in extension of the lead-out plug pins 57,59. Each fuse is thus connected between a lead-in and a lead-out plug pin of the module. The ends of lightning protectors 72 and 73 are held in a similar manner: a first end of each is clipped between a respective resilient blade 80,81 and a part integral with a lead-in plug pin 56 or 57, and a second end is clipped between a resilient blade 82 or 83 and the grounding plug 60 which, in the example, is common for the two lightning protectors. The end of each lightning protector to be connected to ground is hence disposed in the immediate proximity of the corresponding grounding plug pin of the module.

Hence, with such a module, the connection and protection of the first wire of the line are provided by means of the following elements: the lead-in terminal 18, conductor 10, the module lead-in plug pin 56. and on the one hand the lightning protector 72 and the grounding plug 60, and on the other hand the fuse 70, the module lead-out plug pin 57, conductor 11, and lead-out terminal 26. The second wire of the line is connected and protected in a similar manner.

The various elements in the module could be lodged differently: for example, the two lightning protectors could also be arranged in V configuration; also, they could be connected to the grounding circuit by two discrete grounding plugs.

The protection means of the described module 45 comprise, for each wire of the line, a fuse and a lightning protector. In certain circumstances, it may suffice to use only a lightning protector, without a fuse. In this instance, the same modules may be used and it suffices to remove the fuse and to leave only the lightning protector in place. However, when this use is previewed as being frequent, it may be simpler and more economical to replace the module 45 by a special module 51 enclosing only two lightning protectors, one for each wire of the line.

Such a module, 52, is shown on FIGS. 2 and 3. It has two lead-in plug pins 101,102, two corresponding lead-out plug pins 103,104 and a grounding plug pin 105. The lead-in and lead-out plug pins 101 and 103 are connected by a bridge 106 placed in the module. Likewise, a bridge 107 is provided between the lead-in and lead-out plug pins 102 and 104. The bridges 106 and 107 have extensions 108 and 109; likewise the grounding plug pin has an extension 110. The extensions 108,109,110 are parallel to one another and receive, between them, two lightning protectors 111 and 112. The lightning protectors 111,112 are hence each connected by one lateral face to the extension 110 of the grounding plug pin and by another lateral face, opposite the first in the illustrated example, to the extensions 108,109. However, these lightning protectors could be disposed differently in their module, for example one on top of the other.

Figure 10:
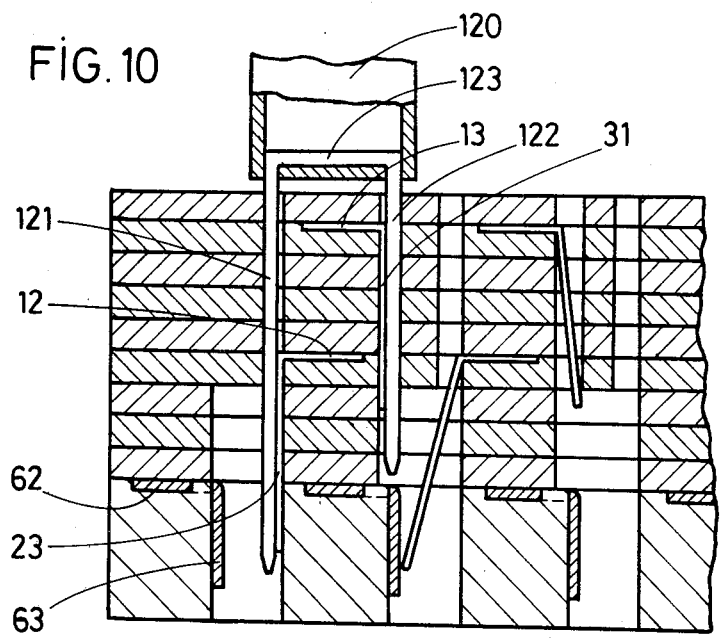
FIGS. 10 and 11 each show, partly in cross-section, a plug element plugged in the pile.

The described connection unit may possibly be used without protection means, i.e., without the described modules. It should in this instance have means for providing an electrical connection between the lead-in and lead-out terminal of each wire of the line. As shown on FIG. 10, these means are formed by a plug element 120 having, for each wire of the line, a lead-in plug pin 121 and a lead-out plug pin 122 connected by a bridge 123. In the illustrated example, the bent parts 23 and 31 of conductors 12 and 13 are hence connected together and the bent part 23 is spaced apart from the tab 63 of the grounding grid 62.

Figure 11:
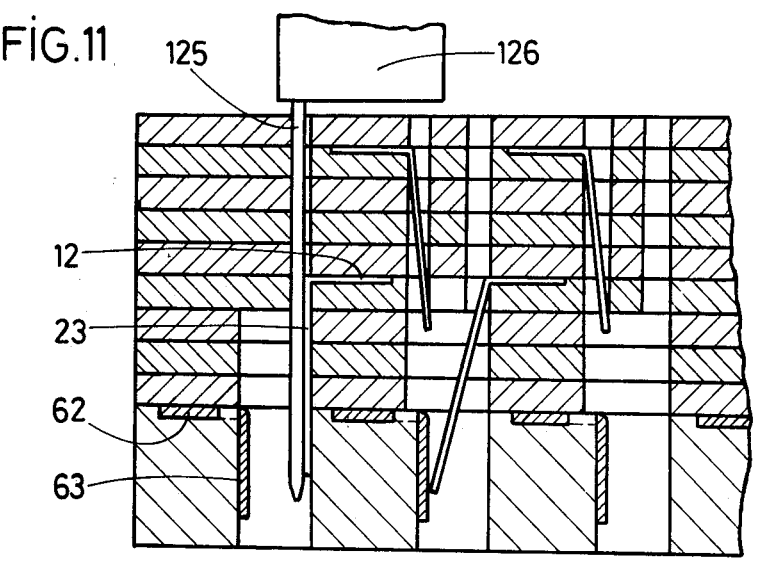

It may also be necessary to break the electrical connection between a first conducting element, for example conductor 12 of FIG. 11, and the ground, without providing an electrical connection between the corresponding lead-in and lead-out terminals of the unit. For this purpose, there is provided a plug element 126 which can be plugged in instead of a module. Element 126 comprises, for each wire of the line, a single conducting or non-conducting plug pin 125. This pin is arranged to plug in against the corresponding bent end 23 of the first preformed conductor 12 to hold it spaced apart from the folded tab 63 of the grounding grid 62.

When it is previewed that only fuse-less modules having lightning protectors will be plugged into a connection unit, it is possible to simplify the structure of this unit. Hence, as shown in FIG. 5, only preformed conductors 115,116 are conserved and used; each line wire thus uses a single conducting element having its second end bent to be connected to the corresponding plug pin of the module and its first end connected to a single piece, 117,118 respectively, forming a lead-in at one of its ends and a lead-out at the other. The single preformed conducting element corresponding to each line wire may hence occupy the place provided for the first or the second of these elements. In the former case it is connected to ground when the module is removed, and in the latter case it is not.

The module used is close to the previously described module 51, but differs in that it one of the two plug pins(lead-in or lead-out, according to the case) is dispensed with. The interest of the arrangement is that each of the inner bridges 106 and 107 of the unit is provided directly between the lead-in and lead-out plug pins. Moreover, a half of the insulating elements (plates) are unused and may hence be dispensed with.

In the just-described connection unit, the first and second preformed conducting elements of each line wire are supported by different insulating plates. The first ends of the conducting elements are disposed at one end of the pile, and their second ends are disposed at the other end of the pile to receive the modules or corresponding plug elements. These second ends of the preformed conducting elements are disposed in three rows 40,41,42 to receive corresponding rows of modules. The lead-in and lead-out terminals are disposed in as many rows 127,128,129 as there are rows of modules. These terminals are disposed perpendicular to the direction of alignment of their rows, substantially in alignment with the corresponding modules. These rows are disposed in the same order: for example, the row 40 of modules corresponds to the row 127 of terminals, ans so on. All of the lead-in terminals are arranged on one face, 34, of the pile, and the lead-out terminals on the other face 35.

The above-described elements could occupy different positions. Hence, for example, the two preformed conducting elements of the same line wire could be supported on the same insulating plate. The lead-in and lead-out terminals could be disposed on either side of the modules; they could be all disposed on the same face as the modules, or all on the opposite face. Also, the order of the rows of modules and the corresponding rows of lead-in and lead-out terminals could be inverted. In the case where the lead-in and lead-out terminals are formed integral with the ends of the preformed conducting elements, instead of leading into transverse orifices in the pile they could leave the pile at the end of the insulating plates; these plates could advantageously be arranged in step formation, the ends of the conducting elements protruding from the pile being bent or flat.

The connection unit according to the invention may be used whenever it is required to connect a great number of line wires in a reduced space. This is notably the case for the connection of cables in telephone exchanges.

What is claimed is:

1. A connection unit for cables, in particular telecommunications cables, comprising:

a pile of insulating support plates having first and second outer faces;

means defining a plurality of orifices traversing said pile of plates from said first to said second outer face;

at least some of said plates carrying at least one preformed conducting element, said conducting elements being disposed in pairs consisting of a first conducting element having a first end connected to or forming a lead-in terminal and a bent second end disposed in a first of said orifices, and a second conducting element having a first end connected to or forming a lead-out terminal and a bent second end disposed in a second of said orifices;

said lead-in terminals being grouped together on one of said first and second faces of said pile and said lead-out terminals also being grouped together on one of said first and second faces of said pile, for connection of lines of a cable;

a grounding circuit disposed adjacent said first face of said pile;

said bent second ends of said first conducting elements being bent towards said first face and being dimensioned and prestressed to tend to come into contact with corresponding parts of said grounding circuit;

each pair of said first and second orifices receiving said second ends of a pair of first and second conducting elements being associated with a third said orifice;

and at least one plug module comprising means for electrically connecting and protecting a pair of said lead-in and lead-out terminals, said module comprising first, second and third parallel plug pins pluggable in said second face of said pile in associated first, second and third orifices whereby said first plug pin contacts said bent second end of said first conducting element and holds it out of contact with said grounding circuit, said second plug pin contacts said bent second end of said second conducting element and said third plug pin contacts a corresponding part of said grounding circuit, said module comprising means for electrically connecting said first and second plug pins and a lightning protector connected between said first and third plug pins.

2. A connection unit according to claim 1, in which said orifices receiving the second ends of said conducting elements are arranged in a given number of substantially parallel rows, said lead-in and lead-out terminals being arranged in the same given number of parallel rows, said terminals being disposed perpendicular to the direction of their rows, generally parallel to said traversing orifices.

3. A connection unit according to claim 2, in which said orifices and the corresponding lead-in and lead-out terminals are disposed in said rows in the same order.

4. A connection unit according to claim 1, in which said lead-in terminals are disposed on one of said faces of the pile and said lead-out terminals are disposed on the other of said faces of said pile.

5. A connection unit according to claim 1, in which some at least of said preformed conducting elements are metal strips embedded in the corresponding support plates.

6. A connection unit according to claim 1, in which said first and second preformed conducting elements of each pair are supported by different insulating plates, said first ends of all the conducting elements being disposed at one end of said pile and said second ends of all the conducting elements being disposed towards another end of said pile.

7. A connection unit for cables, in particular telecommunications cables, for connecting lines of the cable to ground via lightning protectors, comprising:
 a pile of insulating support plates having first and second outer faces;
 means defining a plurality of orifices traversing said pile of plates from said first to said second outer face;
 at least some of said plates carrying at least one preformed conducting element having a first end connected to or forming lead-in and lead-out terminals for connection of a line of a cable, and a bent second end disposed in a first of said orifices;
 said lead-in and lead-out terminals being grouped together on respective faces of said pile and each being formed of a single piece;
 a grounding circuit disposed adjacent said first face of said pile;
 each of said first orifices receiving said second bent end of a conducting element being associated with a second said orifice;
 and at least one plug comprising first and second parallel plug ping pluggable in said second face of said pile in associated first and second orifices whereby said first plug pin contacts said bent second end of said first conducting element and said second plug pin contacts a corresponding part of said grounding circuit, said module comprising a lightning protector connected between said first and second plug pins (FIG. 5).

8. A connection unit for cables, in particular telecommunications cables, comprising:
 a pile of insulating support plates having first and second outer faces;
 means defining a plurality of orifices traversing said pile of plates from said first to said second outer face; and
 at least some of said plates carrying at least one preformed conducting element, said conducting elements being disposed in pairs consisting of a first conducting element having a first end connected to or forming a lead-in terminal and a bent second end disposed in a first of said orifice, and a second conducting element having a first end connected to or forming a lead-out terminal and a bent second end disposed in a second of said orifices;
 said lead-in terminals being grouped together on one of said first and second faces of said pile and said lead-out terminals also being grouped together on one of said first and second faces of said pile, for connection of lines of a cable.

9. A connection unit according to claim 8, comprising a grounding circuit disposed adjacent said first face of said pile, said bent second ends of said first conducting elements being bent towards said first face and being dimensioned and prestressed to tend to come into contact with corresponding parts of said grounding circuit.

10. A connection unit according to claim 9, in which each pair of said first and second orifices receiving said second ends of a pair of first and second conducting elements is associated with a third said orifice, and comprising at least one plug module comprising means for electrically connecting and protecting a pair of said lead-in and lead-out terminals, said module comprising first, second and third parallel plug pins pluggable in said second face of said pile in associated first, second and third orifices whereby said first plug pin contacts said bent second end of said first conducting element and holds it out of contact with said grounding circuit, said second plug pin contacts said bent second end of said second conducting element and said third plug pin contacts a corresponding part of said grounding circuit, said module comprising means for electrically connecting said first and second plug pins and a lightning protector connected between one of said first and second plug pins and said third plug pin.

11. A connection unit according to claim 9, comprising at least one plug element for making contact between a lead-in and a lead-out terminal, said plug element comprising electrically-connected parallel first and second plug pins pluggable in said second face of said pile in first and second orifices whereby said first plug pin contacts said bent second end of said first conducting element and holds it out of contact with said grounding circuit, and said second plug pin contacts said bent second end of said second conducting element.

12. A connection unit according to claim 9, comprising at least one plug element for breaking contact between a said first conducting element and said grounding circuit, said plug element having a plug pin pluggable in said second face of said pile in a first orifice to hold said bent second end of said first conducting element out of contact with said grounding circuit.

13. A connection unit according to claim 9, in which each pair of said first and second orifices receiving said second ends of a pair of first and second conducting elements is associated with a third said orifice, and comprising at least one plug module comprising means for electrically connecting and protecting a pair of said lead-in and lead-out terminals, said module comprising first, second and third parallel plug pins pluggable in said second face of said pile in associated first, second and third orifices whereby said first plug pin contacts said bent second end of said first conducting element and holds it out of contact with said grounding circuit, said second plug pin contacts said bent second end of said second conducting element and said third plug pin contacts a corresponding part of said grounding circuit, said module comprising a fuse connected between said first and second plug pins and a lightning protector connected between said first and third plug pins.

14. A connection unit according to claim 13, in which each said plug module comprises a housing receiving said fuse and said lightning protector arranged in line with one another and clip fitted between the respective plug pins, said module having a lateral opening in said housing to allow replacement of said fuse and said lightning protector.

15. A connection unit according to claim 13, in which said lightning protector has a grounded end disposed in the immediate proximity of and connected to said third plug pin.

16. A connection unit according to claim 13, in which said plug has means for electrically connecting and protecting two pairs of said lead-in and lead-out terminals, comprising two pairs of first and second plug pins, a common third plug pin, and two fuses and lightning protectors disposed side-by-side, said two lightning protectors being connected to the common third plug pin.

17. A connection unit according to claim 16, in which said module has a housing receiving said two lightning protectors and said two fuses spaced apart in V configuration, said module having an opening leading into said housing adjacent facing parts of said fuses.

* * * * *